(12) United States Patent
Takayama

(10) Patent No.: US 9,812,270 B2
(45) Date of Patent: Nov. 7, 2017

(54) INTERLOCK CIRCUIT AND IMAGE FORMING APPARATUS

(71) Applicant: KYOCERA Document Solutions Inc., Osaka-shi, Osaka (JP)

(72) Inventor: Ryo Takayama, Osaka (JP)

(73) Assignee: KYOCERA Document Solutions Inc. (JP)

( * ) Notice: Subject to any disclaimer, the term of this patent is extended or adjusted under 35 U.S.C. 154(b) by 182 days.

(21) Appl. No.: 14/948,571

(22) Filed: Nov. 23, 2015

(65) Prior Publication Data

US 2016/0154386 A1    Jun. 2, 2016

(30) Foreign Application Priority Data

Nov. 28, 2014 (JP) ................. 2014-240844

(51) Int. Cl.
*G05B 19/406* (2006.01)
*H01H 9/54* (2006.01)
*H01H 3/16* (2006.01)

(52) U.S. Cl.
CPC ........... *H01H 9/547* (2013.01); *G05B 19/406* (2013.01); *H01H 9/548* (2013.01); *G05B 2219/34308* (2013.01); *H01H 3/161* (2013.01)

(58) Field of Classification Search
CPC ........ G05B 19/406; G05B 2219/34308; H01H 3/161; H01H 9/547; H01H 9/548

USPC ......................................................... 307/328
See application file for complete search history.

(56) References Cited

U.S. PATENT DOCUMENTS

2007/0188959 A1\* 8/2007 Akerlund ............... H01H 9/548
361/93.1

FOREIGN PATENT DOCUMENTS

| JP | 2001-216857 | 8/2001 |
| JP | 2011-250523 | 12/2011 |
| JP | 2012157146 A | 8/2012 |

OTHER PUBLICATIONS

Japanese Office Action dated Jun. 14, 2016.

\* cited by examiner

*Primary Examiner* — William Hernandez
(74) *Attorney, Agent, or Firm* — Gerald E. Hespos; Michael J. Porco; Matthew T. Hespos

(57) ABSTRACT

An interlock switch is turned on to close a power supply line when a cover is closed, and turned off to open the power supply line when the cover is opened. A time constant circuit is connected to a node side of the interlock switch in the power supply line. A switch control unit determines that a user is intentionally turning on and off the interlock switch and turns off a switch Q1 when a smoothed voltage obtained by smoothing a voltage difference between voltage dividing nodes becomes larger than a threshold value.

5 Claims, 4 Drawing Sheets

INTERLOCK CIRCUIT AND IMAGE FORMING APPARATUS

This application is based on Japanese Patent Application No. 2014-240844 filed with the Japan Patent Office on Nov. 28, 2014, the contents of which are hereby incorporated by reference.

BACKGROUND

The present disclosure relates to an interlock circuit for closing or opening a power supply line and an image forming apparatus with such an interlock circuit.

An image forming apparatus such as a printer or a copier is provided with a cover which is opened and closed in exchanging a consumable such as a toner cartridge and a cover which is opened and closed in removing a sheet remaining in the apparatus due to the occurrence of a paper jam. If a user touches an electrical component (electrical load) in the apparatus during these operations, the user may burn him/herself or get an electrical shock. Thus, the image forming apparatus is generally provided with an interlock circuit for shutting off a power supply voltage supplied to the electrical load when the cover is opened and conducting the power supply voltage to be supplied to the electrical load when the cover is closed.

Here, when the cover is closed, an interlock switch of the interlock circuit is turned on in conjunction with the closing of the cover to resume the supply of the power supply voltage to the electrical load. At this time, an inrush current may be generated and the electrical load and circuit elements constituting the interlock circuit may be deteriorated or broken.

Accordingly, a technology for suppressing the generation of an inrush current by providing a time constant circuit in the interlock circuit is known as a conventional technology 1.

Further, a technology for suppressing an inrush current flowing into an electrical load by reducing a direct-current voltage to a predetermined value when a switch for switching the supply of the direct-current voltage from a direct-current voltage generation circuit to an electrical load is closed is known as a conventional technology 2.

An interlock switch is configured by a mechanical switch for mechanically detecting the opening and closing of a cover and arranged at a position near the cover in a housing. Thus, when opening the cover, a user can easily recognize the presence of the interlock switch. Therefore, the user can intentionally turn on and off the interlock switch by opening the cover and directly touching the interlock switch.

A time constant circuit accumulates electric charges when the interlock switch is on and discharges the accumulated electric charges when the interlock switch is off. Thus, if the interlock switch is repeatedly turned on and off within a certain period, electric charges are injected into the time constant circuit before the discharge of electric charges accumulated while the time constant circuit is on is completed, whereby accumulated electric charges increase. This may cause an excessive inrush current to flow into an electrical load and circuit elements constituting an interlock circuit and deteriorate and break these components.

As just described, the configuration of the conventional technology 1 for preventing an inrush current by providing the time constant circuit has a problem that an excessive inrush current is generated when the interlock switch is repeatedly turned on and off within a certain period by the user. That is, there is a problem that the time constant circuit provided to prevent an inrush current causes the generation of an excessive inrush current.

Further, in the conventional technology 2, the inrush current is suppressed by reducing the direct-current voltage and a premise configuration is different from that of the present disclosure.

The present disclosure aims to provide an interlock circuit and an image forming apparatus capable of preventing the flow of an excessive inrush current even when a user intentionally opens and closes an interlock switch.

SUMMARY

An interlock circuit according to one aspect of the present disclosure includes a power supply line, an interlock switch, a time constant circuit, a first switch and a switch control unit. The power supply line supplies a direct-current voltage supplied from a power supply unit to a load. The interlock switch closes or opens the power supply line. The time constant circuit is connected to the load side of the interlock switch in the power supply line and delays a response of a power supply voltage to be applied to the power supply line when the interlock switch closes the power supply line. The first switch is connected between the time constant circuit and the load. The switch control unit smoothes a voltage difference of the interlock switch and turns off the first switch when an obtained smoothed voltage becomes larger than a threshold value.

DETAILED DESCRIPTION

Figure 1:
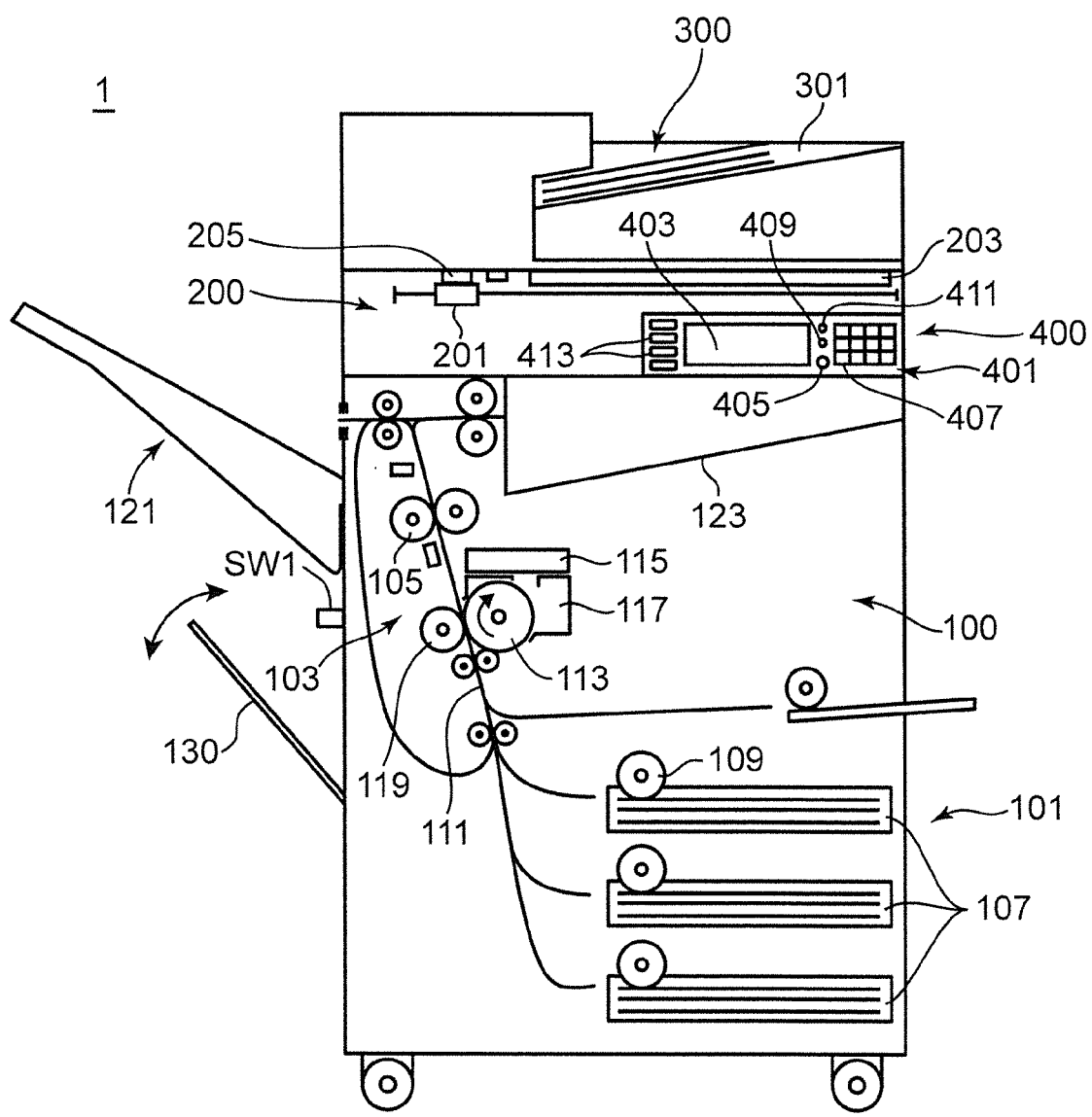
FIG. 1 is a diagram schematically showing the internal structure of an image forming apparatus to which an interlock circuit according to one embodiment of the present disclosure is applicable.

Hereinafter, an embodiment of the present disclosure is described in detail with reference to the drawings. FIG. 1 is a diagram schematically showing the internal structure of an image forming apparatus to which an interlock circuit according to one embodiment of the present disclosure is applicable. An image forming apparatus 1 can be, for example, applied to a digital complex machine having functions of a copier, a printer, a scanner and a facsimile machine. The image forming apparatus 1 includes an apparatus main body 100, a document reading unit 200 arranged on the apparatus main body 100, a document feeding unit 300 arranged on the document reading unit 200 and an operation unit 400 arranged on the front surface of an upper part of the apparatus main body 100.

The document feeding unit 300 functions as an automatic document feeder and conveys a plurality of documents placed on a document placing portion 301 to the document reading unit 200 so that the document reading unit 200 successively reads the documents.

The document reading unit 200 includes a carriage 201 equipped with an exposure lamp and the like, a document platen 203 formed of a transparent material such as glass, an unillustrated CCD (Charge Coupled Device) sensor and a document reading slit 205. In the case of reading a document placed on the document platen 203, the document reading unit 200 lets the CCD sensor read the document while moving the carriage 201 in a longitudinal direction of the document platen 203. Contrary to this, in the case of reading a document fed from the document feeding unit 300, the document reading unit 200 moves the carriage 201 to a position facing the document reading slit 205 and lets the CCD sensor read the document fed from the document feeding unit 300 through the document reading slit 205. The CCD sensor outputs an image of the read document as image data.

The apparatus main body 100 includes a sheet storage unit 101, an image forming unit 103 and a fixing unit 105. The sheet storage unit 101 is arranged in a lowermost part of the apparatus main body 100 and includes sheet trays 107 for storing sheet stacks. The uppermost sheet of the sheet stack stored in the sheet tray 107 is fed toward a sheet conveyance path 111 by a pickup roller 109. The sheet is conveyed to the image forming unit 103 through the sheet conveyance path 111.

The image forming unit 103 forms a toner image on a sheet conveyed thereto. The image forming unit 103 includes a photoconductive drum 113, an exposure unit 115, a developing unit 117 and a transfer unit 119. The exposure unit 115 generates light modulated in accordance with image data (image data output from the document reading unit 200, image data transmitted from a personal computer, facsimile-received image data, etc.) and irradiates it to a uniformly charged circumferential surface of the photoconductive drum 113. In this way, an electrostatic latent image corresponding to the image data is formed on the circumferential surface of the photoconductive drum 113. In this state, toner is supplied from the developing unit 117 to the circumferential surface of the photoconductive drum 113 and a toner image corresponding to the image data is formed on the circumferential surface. This toner image is transferred to a sheet conveyed from the sheet storage unit 101 by the transfer unit 119.

The sheet having the toner image transferred thereto is fed to the fixing unit 105. In the fixing unit 105, heat and pressure are applied to the toner image and the sheet, whereby the toner image is fixed to the sheet. The sheet is discharged to a stack tray 121 or a sheet discharge tray 123. The image forming apparatus 1 prints a monochrome image in the above manner.

The operation unit 400 includes an operation key unit 401 and a display unit 403. The display unit 403 has a touch panel function and displays a screen including soft keys. A user performs setting necessary to carry out a function such as a copy function by operating the soft keys while viewing the screen.

The operation key unit 401 includes operation keys composed of hard keys. Specifically, the operation key unit 401 includes a start key 405, a numeric keypad 407, a stop key 409, a reset key 411, function changeover keys 413 for switching copy, printer, scanner and facsimile functions from one to another and the like.

The start key 405 is a key for starting an operation such as copying and facsimile transmission. The numeric keypad 407 includes keys used to input numbers such as the number of copy sets and facsimile numbers. The stop key 409 is a key for stopping a copying operation and the like halfway. The reset key 411 is a key for returning a set content to an initially set state.

The function changeover keys 413 include a copy key, a transmit key and the like and switch a copy function, a transmit function and the like from one to another. If the copy key is operated, an initial screen for copy is displayed on the display unit 403. If the transmit key is operated, an initial screen for facsimile transmission and mail transmission is displayed on the display unit 403.

An openable and closable cover 130 is provided at a suitable position of a housing of the image forming apparatus 1. The cover 130 may be a cover used in removing a sheet remaining inside when a paper jam occurs. Alternatively, the cover 130 may be a cover used in exchanging a consumable (e.g. toner cartridge) inside the housing of the image forming apparatus 1. In an example of FIG. 1, the cover 130 is provided on the left surface of the housing and rotates clockwise or counterclockwise with a direction orthogonal to the plane of FIG. 1 as an axis of rotation. A grip (not shown) to be gripped by the user is provided on a surface of the cover 130. The user opens the cover 130 by gripping this grip and rotating the cover 130 counterclockwise. In this way, an opening of the housing corresponding to the cover 130 is exposed. The user inserts his/her arm into the image forming apparatus 1 through this opening to perform the operation of removing the sheet described above or the like. On the other hand, the user closes the cover 130 by rotating the cover 130 in an open state clockwise. In this way, the opening is closed.

An interlock switch SW1 is provided near the opening. The interlock switch SW1 includes a slidably provided projection. This projection is pushed into the image forming apparatus 1 by the cover 130 by closing the cover 130, whereby the interlock switch SW1 is turned on. On the other hand, when the cover 130 is opened, this projection projects outwardly of the image forming apparatus 1, whereby the interlock switch SW1 is turned off.

Figure 2:
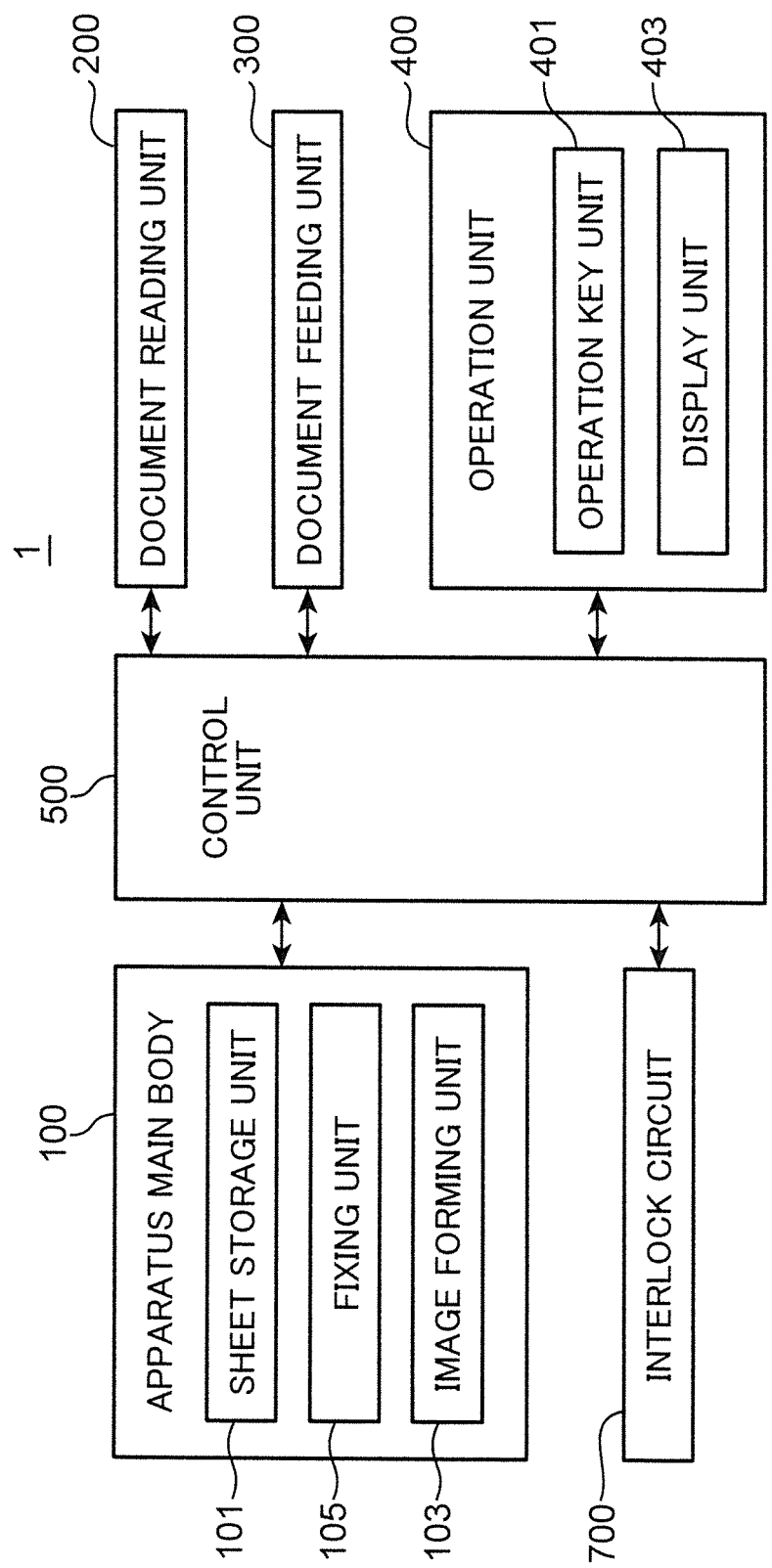
FIG. 2 is a block diagram showing the configuration of the image forming apparatus.

FIG. 2 is a block diagram showing the configuration of the image forming apparatus 1. The image forming apparatus 1 is so configured that the apparatus main body 100, the document reading unit 200, the document feeding unit 300, the operation unit 400, a control unit 500 and an interlock circuit 700 are connected to each other by a bus. The apparatus main body 100, the document reading unit 200, the document feeding unit 300 and the operation unit 400 are not described since being already described.

The control unit 500 includes a CPU (Central Processing Unit), a ROM (Read Only Memory), a RAM (Random Access Memory), an image memory and the like. The CPU executes a control necessary to operate the image forming apparatus 1 on the constituent elements of the image forming apparatus 1 such as the apparatus main body 100. The ROM stores software necessary to control the operation of the image forming apparatus 1. The RAM is used such as to temporarily store data generated during the execution of the software and store application software. The image memory temporarily stores image data (image data output from the document reading unit 200, image data transmitted from a personal computer, facsimile-received image data, etc.).

Figure 3:
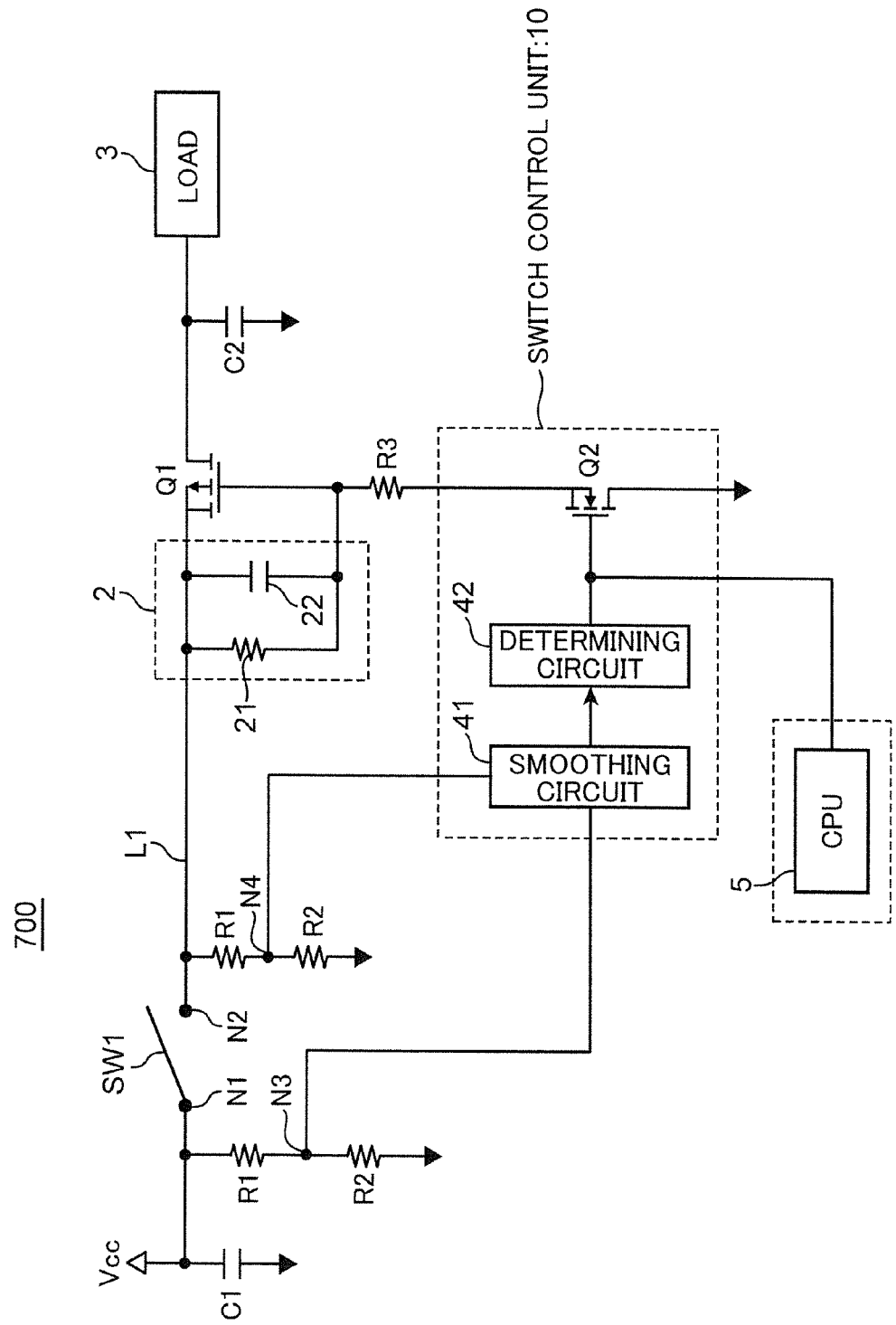
FIG. 3 is a circuit diagram of the interlock circuit in the embodiment.

FIG. 3 is a circuit diagram of the interlock circuit 700 in this embodiment. The interlock circuit 700 includes a power supply line L1, the interlock switch SW1, a time constant circuit 2, a switch Q1 (an example of a first switch) and a switch control unit 10.

The power supply line L1 supplies a direct-current voltage (Vcc) supplied from a power supply unit (not shown) to a load 3. The interlock switch SW1 is configured by a mechanical switch as described with reference to FIG. 1, and turned on to close the power supply line L1 when the cover 130 is closed and turned off to open the power supply line L1 when the cover 130 is opened. Here, N1 denotes a node on the side of the power supply unit and N2 denotes a node on the side of the load 3 in the interlock switch SW1.

The node N1 is grounded via a capacitor C1 and connected to the power supply unit. The node N1 is grounded via voltage dividing resistors R1, R2. The node N2 is also grounded via voltage dividing resistors R1, R2.

The time constant circuit 2 is connected to the side of the node N2 of the interlock switch SW1 in the power supply line L1. The time constant circuit 2 delays a response of the direct-current voltage applied to the power supply line L1 when the power supply line L1 is closed by the interlock switch SW1.

The time constant circuit 2 includes a resistor 21 and a capacitor 22. The resistor 21 and the capacitor 22 are connected in parallel, one ends thereof are connected to the node N2 and the other ends are connected to a gate of a switch Q1. That is, the time constant circuit 2 is connected between a source and the gate of the switch Q1.

When the interlock switch SW1 is turned on, a steeply rising direct-current voltage is input to the time constant circuit 2 from the power supply unit. The time constant circuit 2 outputs the input direct-current voltage toward the load 3 while slowing a response speed of the direct-current voltage. In this way, the slope of a waveform when the direct-current voltage output from the time constant circuit 2 rises becomes moderate and the generation of an inrush current in a part of the power supply line L1 closer to the load 3 than the time constant circuit 2 is suppressed. As a result, it is suppressed that the inrush current flows into the switch Q1 and the load 3 to deteriorate and break these components. Here, the response speed of the direct-current voltage is more slowed as a time constant determined by the product of a resistance value of the resistor 21 and a capacitance value of the capacitor 22 increases. Accordingly, a time constant suitable to suppress an inrush current is set in the time constant circuit 2.

The switch Q1 is configured by a p-type MOSFET, the source thereof is connected to the power supply line L1 and a drain thereof is connected to the load 3.

The switch control unit 10 smoothes a voltage difference between the node N1 and the node N2 of the interlock switch SW1 and turns off the switch Q1 when the obtained smoothed voltage becomes larger than a threshold value.

It is assumed that the user opens the cover 130 and intentionally turns on and off the interlock switch SW1. In this case, an off-period of the interlock switch SW1 is not sufficiently secured and electric charges are injected into the capacitor 22 again by turning on the interlock switch SW1 before the capacitor 22 discharges all electric charges accumulated while the interlock switch SW1 is on, whereby accumulated electric charges increase. In this way, an excessive inrush current flows to break and deteriorate the switch Q1, the load 3, the capacitor C1 and a capacitor C2.

Accordingly, the switch control unit 10 determines that the user is intentionally turning on and off the interlock switch SW1 and turns off the switch S1 when a smoothed voltage obtained by smoothing a voltage difference between voltage dividing nodes N3 and N4 becomes larger than a threshold value. In this way, the time constant circuit 2 is separated from the load 3 and the deterioration and breakage of the switch Q1 and the load 3 can be prevented.

Specifically, the switch control unit 10 includes a smoothing circuit 41, a determining circuit 42 and a switch Q2 (an example of a second switch). The smoothing circuit 41 is connected to the voltage dividing node N3 between the voltage dividing resistors R1 and R2 and a voltage of the node N1 divided by the voltage dividing resistors R1, R2 is input thereto. Further, the smoothing circuit 41 is connected to the voltage dividing node N4 between the voltage dividing resistors R1 and R2 and a voltage of the node N2 divided by the voltage dividing resistors R1, R2 is input thereto. Here, resistance values of the voltage dividing resistors R1, R2 connected to the node N1 are respectively the same as those of the voltage dividing resistors R1, R2 connected to the node N2. In this way, voltage dividing ratios of the voltage dividing resistors R1, R2 connected to the node N1 are set equal to those of the voltage dividing resistors R1, R2 connected to the node N2. Here, values suitable for the smoothing circuit 41 are set as the voltage dividing ratios by the voltage dividing resistors R1, R2.

The smoothing circuit 41 includes, for example, a smoothing capacitor, smoothes the voltage difference between the nodes N1 and N2 and outputs the obtained smoothed voltage to the determining circuit 42.

Specifically, the smoothing circuit 41 smoothes the voltage difference between the voltage dividing nodes N3 and N4 and outputs the obtained smoothed voltage to the determining circuit 42. Note that although the smoothing circuit 41 smoothes the voltage difference between the voltage dividing nodes N3 and N4 instead of the voltage difference between the nodes N1 and N2, it is, in essence, the same as smoothing the voltage difference between the nodes N1 and N2 since the voltage dividing ratios of the voltage dividing nodes N3, N4 are equal.

The determining circuit 42 is configured, for example, by a comparator and turns on the switch Q2 by setting a voltage at a gate of the switch Q2 to a high level when the smoothed voltage output from the smoothing circuit 41 is larger than a threshold value. On the other hand, the determining circuit 42 turns off the switch Q2 by setting the voltage at the gate of the switch Q2 to a low level when the smoothed voltage is not larger than the threshold value.

The switch Q2 is configured by an n-type MOSFET, a drain thereof is grounded and a source thereof is connected to the gate of the switch Q1 via a resistor R3. In this way, when the switch Q2 is turned on, a voltage at the gate of the switch Q1 is set to a high level to turn off the switch Q1. On the other hand, when the switch Q2 is turned off, the voltage at the gate of the switch Q1 is set to a low level to turn on the switch Q1.

Accordingly, the switch Q1 is turned off and the time constant circuit 2 is separated from the load 3 when the smoothed voltage is larger than the threshold value. On the other hand, the switch Q1 is turned on and the time constant circuit 2 is connected to the load 3 when the smoothed voltage is not larger than the threshold value.

The CPU 5 is configured by the CPU of the control unit 500 of FIG. 2. The CPU 5 turns on the switch Q2, turns off the switch Q1 and separates the load 3 from the power supply unit, for example, when the image forming apparatus 1 is shifted to a sleep mode. On the other hand, the CPU 5 turns off the switch Q2, turns on the switch Q1 and connects the load 3 to the power supply unit when the image forming apparatus 1 is shifted to a standby mode.

The load 3 is configured by a component constituting the image forming apparatus 1 and may be, for example, any one of the fixing unit 105, the image forming unit 103, the document reading unit 200, the document feeding unit 300 and the operation unit 400 shown in FIG. 2. Note that the load 3 is provided with a relay switch (not shown) for shutting off the supply of power from the power supply unit. If an inrush current is generated, this relay switch is deteriorated and broken.

The capacitor C2 is a capacitor for stabilizing a direct-current voltage to be supplied to the load 3. If an excessive inrush current flows, an excessive amount of electric charges are charged into the capacitor C2. This causes an excessive current to be supplied to the load 3 from the capacitor C2. The load 3 is deteriorated and broken also by this.

Figure 5:
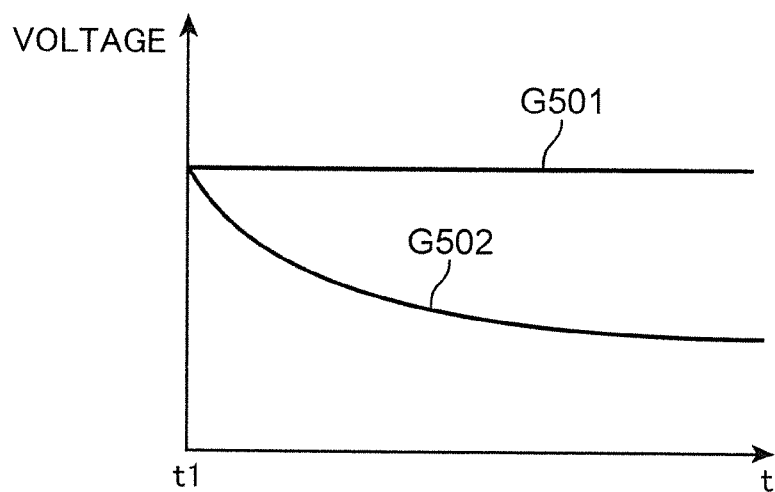
FIG. 5 is a graph showing a voltage of a voltage dividing node N3 and a smoothed voltage of a voltage dividing node N4 when an interlock switch is repeatedly turned on and off.

FIG. 5 is a graph showing the voltage of the voltage dividing node N3 and the smoothed voltage of the voltage dividing node N4 when the interlock switch SW1 is repeatedly turned on and off, wherein a vertical axis represents voltage and a horizontal axis represents time (t). A graph G501 represents the voltage of the voltage dividing node N3 and a graph G502 represents the smoothed voltage of the voltage dividing node N4.

At time t1, the user starts turning on and off the interlock switch SW1. This causes the smoothed voltage of the voltage dividing node N4 to decrease as shown by the graph G502. On the other hand, a constant voltage is maintained at the voltage dividing node N3.

Since the direct-current voltage is constantly supplied to the node N1 from the power supply unit, the constant voltage is maintained at the voltage dividing node N3. On the other hand, since the same direct-current voltage as that applied to the node N1 is applied to the node N2 when the interlock switch SW1 is on, but the direct-current voltage is not supplied form the power supply unit when the interlock switch SW1 is turned off, the voltage of the node N2 decreases. Thus, the voltage of the node N2 changes in a pulsed manner if the interlock switch SW1 is repeatedly turned on and off. Associated with this, the voltage of the voltage dividing node N4 also changes in a pulsed manner. Thus, the smoothed voltage obtained by smoothing the voltage of the voltage dividing node N4 becomes lower than the voltage of the voltage dividing node N3. The smoothed voltage increases in a negative direction as an on-off duty ratio of the interlock switch SW1 decreases, i.e. as a ratio of the off-period increases. Thus, the voltage difference obtained by subtracting the smoothed voltage of the voltage dividing node N4 from the voltage of the voltage dividing node N3 becomes higher when the user repeatedly turns on and off the interlock switch SW1 than that when the user does not repeatedly turn on and off the interlock switch SW1. The same applies also in the case of smoothing the voltage difference between the voltage dividing nodes N3 and N4.

Accordingly, the smoothing circuit 41 smoothes the voltage difference obtained by subtracting the voltage of the voltage dividing node N4 from the voltage of the voltage dividing node N3 and outputs the obtained smoothed voltage to the determining circuit 42. Then, the determining circuit 42 can determine that the user has intentionally turned on and off the interlock switch SW1 when the smoothed voltage becomes larger than the threshold value and determine that the user has not intentionally turned on and off the interlock switch SW1 when the smoothed voltage is not larger than the threshold value.

Here, when intentionally turning on and off the interlock switch SW1, the user has to constantly press the interlock switch SW1. Thus, there is estimated to be a limit in an on-period of the interlock switch SW1. Further, when the user intentionally turns on and off the interlock switch SW1, there is a certain limit in a time until the user presses the interlock switch SW1 again after releasing the interlock switch SW1. Thus, there is estimated to be a limit in the off-period.

Accordingly, a value obtained by smoothing the voltage difference between the voltage dividing nodes N3 and N4 when the interlock switch SW1 is turned on and off using a duty ratio specified from a maximum value of the on-period and a minimum value of the off-period assumed when the user intentionally turns on and off the interlock switch SW1 can be adopted as the threshold value.

Figure 4:
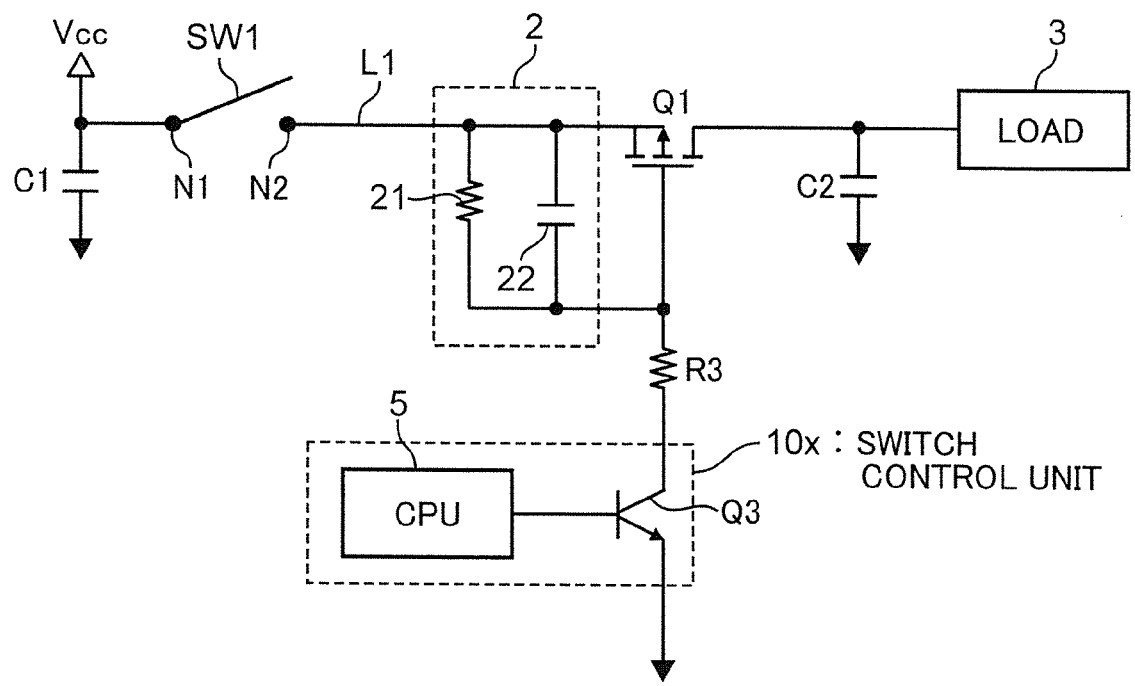
FIG. 4 is a circuit diagram of an interlock circuit as a comparative example.

FIG. 4 is a circuit diagram of an interlock circuit 700X as a comparative example. Note that the same circuit components as in FIG. 3 are denoted by the same reference signs in FIG. 4. In FIG. 4, a switch control unit 10X is provided instead of the switch control unit 10.

The switch control unit 10X includes a CPU 5 and a switch Q3. The switch Q3 is, for example, configured by an npn-bipolar transistor, an emitter thereof is grounded, a base thereof is connected to the CPU 5 and a collector thereof is connected to a gate of a switch Q1 via a resistor R3.

Further, since the voltages of the nodes N1, N2 are not monitored in FIG. 4, the voltage dividing resistors R1, R2 are omitted from the interlock circuit 700X. The CPU 5 turns on the switch Q3 and turns off the switch Q1 when the image forming apparatus 1 is shifted to the sleep mode. On the other hand, the CPU 5 turns off the switch Q3 and turns on the switch Q1 when the image forming apparatus 1 is shifted to the standby mode.

It is assumed that the interlock switch SW1 is turned on from off in the standby mode. In this case, an inrush current is suppressed by the time constant circuit 2. However, if the interlock switch SW1 is intentionally repeatedly turned on and off by the user, electric charges are accumulated in the capacitor 22. This causes a problem in the interlock circuit 700X that a very large inrush current flows in a power supply line L1.

On the other hand, in the interlock circuit 700 of FIG. 3, the switch Q1 is turned off and the time constant circuit 2 is separated from the load 3 by the switch control unit 10 when the interlock switch SW1 is intentionally repeatedly turned on and off by the user. Thus, the deterioration and breakage of the load 3 and the switch Q1 can be prevented.

Effects of this embodiment can be summarized as follows.

(1) If the interlock switch SW1 is intentionally repeatedly turned on and off by the user, the voltage of the node N1 on the power supply side of the interlock switch SW1 is maintained constant, but the voltage of the node N2 on the side of the load 3 of the interlock switch SW1 changes in a pulsed manner. Thus, although it depends on the duty ratio, the smoothed voltage of the voltage difference between the nodes of the interlock switch SW1 increases when the interlock switch SW1 is repeatedly turned on and off as compared to the case where the interlock switch SW1 is not repeatedly turned on and off.

Accordingly, it can be determined that the interlock switch SW1 has been repeatedly turned on and off if the smoothed voltage is larger than the threshold value. If the smoothed voltage is larger than the threshold value, the switch Q1 is turned off and the time constant circuit 2 is separated from the load 3. As a result, an excessive inrush current is not output from the time constant circuit 2 by repeatedly turning on and off the interlock switch SW1 and the flow of the excessive inrush current in the power supply line is prevented. Thus, the deterioration and breakage of the switch Q1 and the load 3 can be prevented.

(2) Since the switch control unit 10 can on-off control the switch Q1 using the switch Q2, the switch Q1 can be accurately turned on and off.

(3) The interlock switch SW1 is turned on and off in conjunction with the closing and opening of the cover 130 of the image forming apparatus 1. Thus, the flow of an excessive inrush current in the power supply line L1 can be prevented when the user opens the cover 130 and intentionally turns on and off the interlock switch SW1.

(4) The duty ratio specified from the maximum value of the on-period and the minimum value of the off-period assumed when the user intentionally turns on and off the interlock switch SW1 is assumed as a reference duty ratio. In this case, it is hard to assume that the on-off duty ratio of the interlock switch exceeds the reference duty ratio when the user intentionally turns on and off the interlock switch SW1.

On the other hand, the smoothed voltage of the interlock switch SW1 tends to increase as the on-off duty ratio of the interlock switch SW1 decreases. Accordingly, the smoothed voltage of the interlock switch SW1 when the user intentionally turns on and off the interlock switch SW1 becomes larger than the smoothed voltage of the interlock switch SW1 at the reference duty ratio. Thus, whether or not the user has intentionally turned on and off the interlock switch SW1 can be accurately determined by setting the threshold value as described above.

The present embodiment can be embodied in the following modes.

(1) Although the p-type MOSFET is used as the switch Q1 in FIG. 3, there is no limitation to this and an n-type MOSFET or a bipolar transistor may be used.

(2) Although the n-type MOSFET is used as the switch Q2 in FIG. 3, there is no limitation to this and a p-type MOSFET or a bipolar transistor may be used.

(3) Although the smoothing circuit 41 is configured by the smoothing capacitor, there is no limitation to this and a hysteresis comparator may be adopted as long as a circuit can hold the smoothed voltage of the interlock switch SW1 when the interlock switch SW1 is turned off.

Although the present disclosure has been fully described by way of example with reference to the accompanying drawings, it is to be understood that various changes and modifications will be apparent to those skilled in the art. Therefore, unless otherwise such changes and modifications depart from the scope of the present disclosure hereinafter defined, they should be construed as being included therein.

The invention claimed is:

1. An interlock circuit, comprising:
a power supply line configured to supply a direct-current voltage supplied from a power supply unit to a load;
an interlock switch configured to open and close the power supply line, and including a first node at a side of the power switch unit and a second node at a side of the load;
a time constant circuit connected to the second node in the power supply line and configured to delay a response of a power supply voltage to be applied to the power supply line when the interlock switch closes the power supply line;
a first switch connected between the time constant circuit and the load; and
a switch control unit configured to smooth a voltage difference between the first node and the second node and turn off the first switch when an obtained smoothed voltage becomes larger than a threshold value.

2. The interlock circuit of claim 1, wherein the switch control unit includes:
a smoothing circuit configured to smooth the voltage difference between the first node and the second node;
a determining circuit configured to determine whether or not the smoothed voltage is larger than the threshold value; and
a second switch configured to turn off the first switch when the smoothed voltage is determined to be larger than the threshold value by the determining circuit.

3. The interlock circuit of claim 1, wherein:
the interlock switch closes the power supply line when a cover of an image forming apparatus is opened and opens the power supply line when the cover is closed.

4. The interlock circuit of claim 1, further comprising:
a memory for storing the threshold value in advance, wherein:
the threshold value is a value obtained by smoothing the voltage difference between the first node and the second node when the interlock switch is turned on and off at a duty ratio specified from a maximum value of an on-period and a minimum value of an off-period assumed when a user intentionally turns on and off the interlock switch.

5. An image forming apparatus, comprising the interlock circuit of claim 1.

* * * * *